United States Patent

Matoba

[11] Patent Number: 5,905,049
[45] Date of Patent: May 18, 1999

[54] DIELECTRIC CERAMIC COMPOSITION

[75] Inventor: Hiroaki Matoba, Moriyama, Japan

[73] Assignee: Murata Manufacturing Co., Ltd., Japan

[21] Appl. No.: 08/968,993

[22] Filed: Nov. 12, 1997

[30] Foreign Application Priority Data

Nov. 12, 1996 [JP] Japan .................... 8-300133

[51] Int. Cl.$^6$ .......................... C04B 35/495; H01G 4/14; H01G 4/06
[52] U.S. Cl. ................. 501/134; 361/313; 361/321.4; 361/321.5
[58] Field of Search ............. 501/134; 361/313, 361/321.4, 321.5

[56] References Cited

U.S. PATENT DOCUMENTS

| | | | |
|---|---|---|---|
| 4,704,373 | 11/1987 | Kinoshita et al. | 501/134 |
| 5,415,945 | 5/1995 | Azumi et al. | 501/134 |
| 5,759,934 | 6/1998 | Matoba | 501/134 |

OTHER PUBLICATIONS

Patent Abstract XP–00205055896, JP 05 058 645 A, Mar. 9, 1993, Hitachi Metals Ltd., Piezoelectric Ceramic Composition Actuate Comprise Mixture Lead Nickel, Niobate Lead Titanate Lead Zirconate Lead Tungstate.
WPIDS Abstract No. 87–174383, abstract of Japanese Patent Specification No. 62–105946, May 1987.

*Primary Examiner*—Anthony Green
*Attorney, Agent, or Firm*—Ostrolenk, Faber, Gerb & Soffen, LLP

[57] ABSTRACT

Disclosed is a dielectric ceramic composition having a high dielectric constant, which can be fired along with silver and silver alloys at temperatures not higher than 1000° C. To a two-component dielectric ceramic composition comprising a solid solution that consists essentially of lead nickel niobate $Pb(Ni_{1/3}Nb_{2/3})O_3$ and lead titanate $PbTiO_3$, added is at least one additive selected from the group consisting of the compounds $Pb_3O_4$, CuO and $WO_3$ capable of forming a composition of a chemical formula $Pb(Cu_{1/2}W_{1/2})O_3$, and manganese oxide. The additives have the ability to promote the sintering of the two-component composition and to lower the firing temperature for the composition.

16 Claims, 2 Drawing Sheets

DIELECTRIC CERAMIC COMPOSITION

FIELD OF THE INVENTION

The present invention relates to a ceramic composition, in particular, to a dielectric ceramic composition capable of being fired at relatively low temperatures.

BACKGROUND OF THE INVENTION

With the recent demand for small-sized, large-capacity devices in ceramic capacitors, monolithic ceramic capacitors have become increasingly popular. Monolithic ceramic capacitors are produced by alternately laminating inner electrode layers and dielectric ceramic layers followed by firing the resulting laminate. For the dielectric ceramic layers are used ceramic capacitor materials having a high dielectric constant. The monolithic ceramic capacitors thus produced have a large capacitance.

Heretofore, barium titanate-type materials have been widely used as such high dielectric ceramic capacitor materials. However, those materials must be fired at high temperatures of not lower than 1300° C. Therefore, when they are used in producing monolithic ceramic capacitors, expensive noble metals such as platinum and palladium must be used to form the inner electrodes in the capacitors.

On the other hand, some recent reports have proposed the use of lead-containing composite perovskite compounds which can be fired at low temperatures and have a high dielectric constant as the materials for monolithic ceramic capacitors. For example, it is reported in JP-B-01-46471 that a two-component composition comprising lead nickel niobate $Pb(Ni_{1/3}Nb_{2/3})O_3$ and lead titanate $PbTiO_3$ has an extremely high dielectric constant.

However, the firing temperature for the conventional barium titanate-type materials is not less than 1300° C. and that for the conventional lead-containing composite perovskite compounds is about 1100° C. Therefore, all those conventional materials are problematic in that they could not be fired together with inexpensive silver and silver alloys. In particular, where the conventional barium titanate-type materials and lead-containing composite perovskite compounds are used to produce monolithic ceramic capacitors, inexpensive silver or silver alloys could not be employed to form the inner electrodes for those capacitors, making it is impossible to produce monolithic ceramic capacitors at a low production cost.

SUMMARY OF THE INVENTION

The object of the present invention is to solve the problems mentioned above and to provide a dielectric ceramic composition having a high dielectric constant and capable of being fired at a temperature of 1000° C. or lower along with silver and silver alloys.

After having studied the firing condition for the two-component composition comprising lead nickel niobate $Pb(Ni_{1/3}Nb_{2/3})O_3$ and lead titanate $PbTiO_3$ and also various additives thereto capable of promoting the sintering of the composition, the present inventors have found that manganese oxide (MnO), and the compounds $Pb_3O_4$, $CuO$ and $WO_3$ capable of forming a composition of $Pb(Cu_{1/2}W_{1/2})O_3$ can promote the sintering of the two-component composition while lowering the firing temperature for the composition, and have completed the present invention.

Specifically, the invention provides a dielectric ceramic composition including a solid solution including lead nickel niobate $Pb(Ni_{1/3}Nb_{2/3})O_3$ and lead titanate $PbTiO_3$, and at least one additive selected from the group consisting of (a) $Pb_3O_4$, $CuO$ and $WO_3$ and (b) $MnO$.

Preferably, the solid solution is represented by a formula, $xPb(Ni_{1/3}Nb_{2/3})O_3$-$(1-x)$ $PbTiO_3$, in which x indicates a molar fraction of $0.57 \leq x \leq 0.87$, in order to make the composition have a relatively high specific inductive capacity.

More preferably, the solid solution is represented by a formula, $xPb(Ni_{1/3}Nb_{2/3})O_3$-$(1-x)PbTiO_3$, in which x indicates a molar fraction of $0.65 \leq x \leq 0.75$.

Preferably, the amount of manganese oxide (MnO) in the dielectric ceramic composition is not larger than about 1% by weight, more preferably not larger than about 0.75%, relative to the solid solution, in order not to lower the specific inductive capacity of the composition.

Also preferably, the amount of compounds of $Pb_3O_4$, $CuO$ and $WO_3$ in the dielectric ceramic composition is not larger than about 9% by weight, more preferably not larger than about 4.5%, in terms of $Pb(Cu_{1/2}W_{1/2})O_3$ and relative to the essential component of the composition, in order not to lower the specific inductive capacity of the composition.

More preferably, the dielectric ceramic composition of the invention contains both the group of compounds $Pb_3O_4$, $CuO$ and $WO_3$ capable of forming $Pb(Cu_{1/2}W_{1/2})O_3$, and manganese oxide, in order to further lower the firing temperature for the composition, in which the amount of manganese oxide (MnO) is not larger than about 1% by weight relative to the essential component of the composition and that of the group of compounds of $Pb_3O_4$, $CuO$ and $WO_3$ is not larger than about 9% by weight in terms of $Pb(Cu_{1/2}W_{1/2})O_3$ and relative to the solid solution, in order not to lower the specific inductive capacity of the composition.

DESCRIPTION OF PREFERRED EMBODIMENTS OF THE INVENTION

Figure 1:
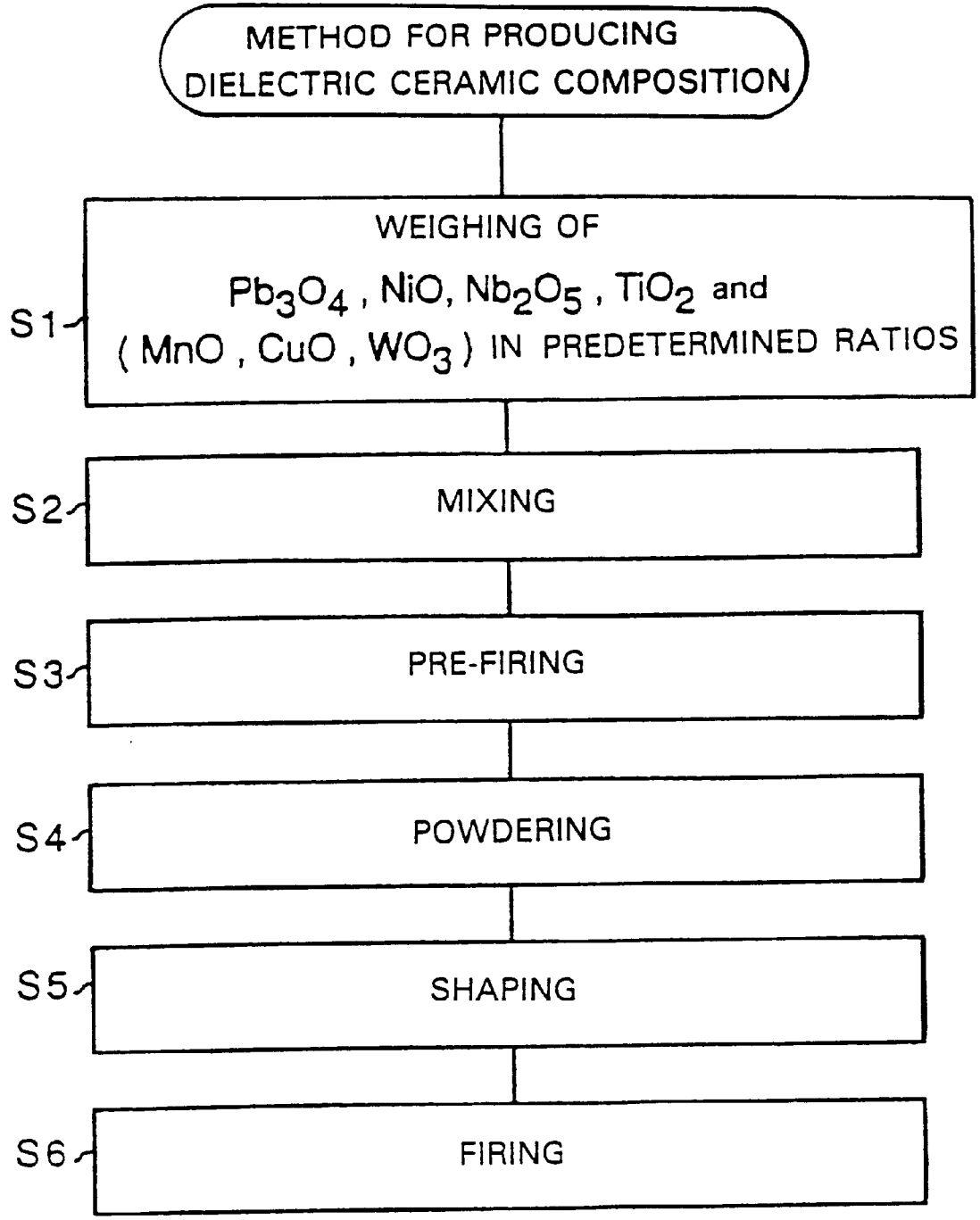
FIG. 1 is a flow chart for one embodiment of producing the dielectric ceramic composition of the invention.

Now, preferred embodiments of the dielectric ceramic composition of the invention are described hereinunder.

Embodiment 1

Embodiment 1 of the invention is the dielectric ceramic composition which consists essentially of a solid solution of the formula $xPb(Ni_{1/3}Nb_{2/3})O_3$-$(1-x)PbTiO_3$, where x indicates the molar fraction, and which contains manganese oxide MnO that acts to lower the firing temperature for the solid solution.

In Embodiment 1, the amount of manganese oxide to be added to the composition is preferably not larger than about 1% by weight relative to the essential component, in order not to lower the high specific inductive capacity, $\in$, of the essential component, solid solution.

The dielectric ceramic composition of Embodiment 1 having the constitution mentioned above can be fired at low temperatures of 1000° C. or lower, while having a relatively high specific inductive capacity, $\in$.

Embodiment 2

Embodiment 2 of the invention is the dielectric ceramic composition which consists essentially of a solid solution of the formula $xPb(Ni_{1/3}Nb_{2/3})O_3$-$(1-x)PbTiO_3$, where x indicates the molar fraction, and which contains the compounds $Pb_3O_4$, $CuO$ and $WO_3$ which acts to lower the firing temperature for the solid solution. In this, the group of compounds $Pb_3O_4$, CuO and $WO_3$ can form a composition of the chemical formula $Pb(Cu_{1/2}W_{1/2})O_3$.

In Embodiment 2, the amount of the compounds $Pb_3O_4$, CuO and $WO_3$ added to the dielectric ceramic composition is preferably not larger than about 9% by weight in terms of $Pb(Cu_{1/2}W_{1/2})O_3$ and relative to the essential component, in order not to lower the high specific inductive capacity, $\in$, of the essential component, solid solution.

The dielectric ceramic composition of Embodiment 2 having the constitution mentioned above can be fired at low temperatures of 1000° C. or lower, while having a relatively high specific inductive capacity, $\in$.

Embodiment 3

Embodiment 3 of the invention is the dielectric ceramic composition which consists essentially of a solid solution of the formula $xPb(Ni_{1/3}Nb_{2/3})O_3$-$(1-x)PbTiO_3$, where x indicates the molar fraction, and which contains both manganese oxide MnO and the compounds $Pb_3O_4$, CuO and $WO_3$, both of which act to lower the firing temperature for the solid solution. In this, the compounds $Pb_3O_4$, CuO and $WO_3$ can form a composition of the chemical formula $Pb(CU_{1/2}W_{1/2})O_3$.

In Embodiment 3, the amount of manganese oxide MnO added to the dielectric ceramic composition is preferably not larger than about 1% by weight relative to the essential component and that of the compounds $Pb_3O_4$, CuO and $WO_3$ added thereto is preferably not larger than about 9% by weight in terms of $Pb(Cu_{1/2}W_{1/2})O_3$ and relative to the essential component, in order not to lower the high specific inductive capacity, $\in$, of the essential component, i.e., the solid solution.

The dielectric ceramic composition of Embodiment 3 having the constitution mentioned above can be fired at lower temperatures than that of Embodiment 1 and Embodiment 2, while having a relatively high specific inductive capacity, $\in$.

In those Embodiments 1 to 3, the solid solution of the essential component of the formula $xPb(Ni_{1/3}Nb_{2/3})O_3$-$(1-x)PbTiO_3$, where x indicates the molar fraction, is preferably so defined that x in that formula falls within the range of $0.57 \leq x \leq 0.87$ in order to make the dielectric ceramic composition have a high specific inductive capacity, $\in$, but is more preferably so defined that x therein falls within the range of $0.65 \leq x \leq 0.75$ in order to make the composition have a higher specific inductive capacity, $\in$.

Now, referring to FIG. 1, hereinunder described is a method for producing the dielectric ceramic composition of Embodiments 1 to 3. In this method, $Pb_3O_4$, NiO, $Nb_2O_5$, $TiO_2$, MnO, CuO and $WO_3$ are weighed to give the essential component and the additive in a predetermined ratio in the step S1. In the step S2, the thus-weighed materials are mixed in a wet or dry system. Then, in the step S3, the resulting mixture is pre-fired at a predetermined temperature to give a solid solution of a dielectric ceramic composition material. Next, in the step S4, this dielectric ceramic composition material is powdered to obtain a powder of the material. In the next step S5, the powder is shaped to have a predetermined configuration along with a resin binder or the like. Then, in the step S6, this is fired at a relatively low, predetermined temperature of not higher than 1000° C., whereby the powdery composition is sintered into a dielectric ceramic composition.

Figure 2:
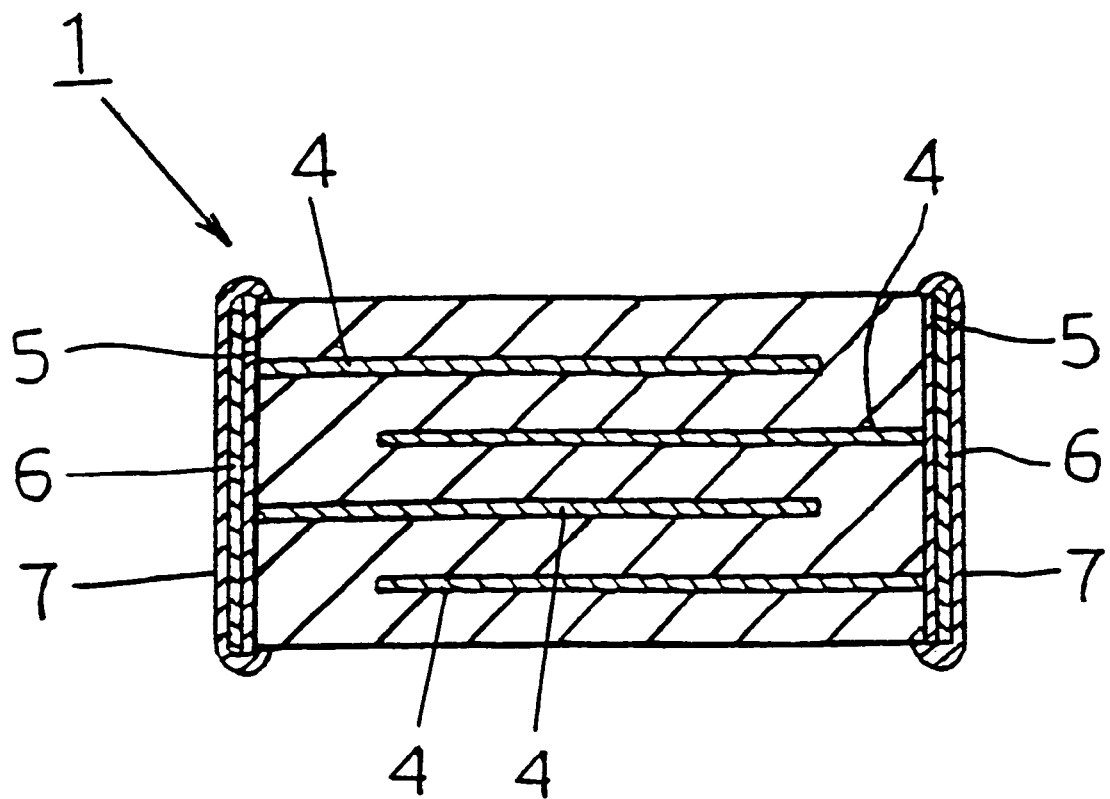
FIG. 2 is a sectional view of a monolithic ceramic capacitor in accordance with the present invention.

For example, where the dielectric ceramic composition of the invention is used to produce a monolithic ceramic capacitor 1 whose sectional view is shown in FIG. 2, a resin binder such as polyvinyl alcohol is added to the powdery dielectric ceramic composition and the resulting mixture is shaped into green sheets in the step S5. Then, those green sheets are alternately laminated with electrode layers 4 made of silver or a silver alloy, the resulting laminate is cut to have a predetermined shape, an electrode paste is applied to the edges of the thus-shaped laminate to form edge electrodes 5 therearound, and finally the unitary laminate thus composed of the green sheets and the electrodes is fired to obtain a monolithic ceramic capacitor. If necessary, a first plating layer 6 and a second plating layer 7 may be applied on the electrodes 5.

In the monolithic ceramic capacitors comprising the dielectric ceramic composition of any of those Embodiments 1 to 3, the composition can be fired at low temperatures of not higher than 1000° C. Therefore, inexpensive silver and silver alloys can be used to form the inner electrodes of those capacitors, in place of expensive noble metals such as platinum and palladium, and the capacitors can be produced at low cost.

Now, examples of the invention are described below with reference to Table 1.

EXAMPLES

In these examples, starting materials of $Pb_3O_4$, NiO, $Nb_2O_5$, $TiO_2$, MnO, CuO and $WO_3$ were wet-milled in a ball mill to give final compositions shown in Table 1, then vaporized and dried. The compositions in Table 1 are as fired. Next, each powdery mixture was pre-fired at 750° C. for 2 hours to obtain a predetermined, powdery dielectric ceramic composition. This was next wet-milled along with 5 parts by weight of a vinyl acetate-type binder in a ball mill. Then, the wet mixture was vaporized, dried and pressed, and the resulting powdery mixture was shaped under a pressure of 2.5 tons/cm$^2$ to give discs each having a diameter of 10 mm and a thickness of 1.2 mm. These discs were fired in an electric furnace having a Pb atmosphere at the different temperatures shown in Table 1. Next, an Ag paste intended to form an electrode was applied to each disc, and fired at 800° C. to prepare samples. The specific inductive capacity, $\in$, and the dielectric loss (tan δ) of each sample were measured at 1 KHz, 1 Vrms and 20° C. To measure its specific resistance, ρ, a voltage of 250 V was applied to each sample at 25° C. for 120 seconds.

To prepare the samples of the dielectric ceramic composition, the molar fraction x in the chemical formula $xPb(Ni_{1/3}Nb_{2/3})O_3$-$(1-x)PbTiO_3$ representing the essential component constituting the composition was varied within the defined range, as in Table 1, while the amount, α, the % by weight relative to the essential component of the manganese oxide additive (MnO) added to the essential component as well as the amount, β, the % by weight in terms of $Pb(Cu_{1/2}W_{1/2})O_3$ and relative to the essential component of the additive of $Pb_3O_4$, CuO and $WO_3$ added thereto was varied within the defined range, as shown in Table 1. The firing temperatures for those samples, and also the specific inductive capacity $\in$, the dielectric loss tan δ, and the specific resistivity ρ of each sample are shown in Table 1.

TABLE 1

$x\text{Pb}(\text{Ni}_{1/3}\text{Nb}_{2/3})\text{O}_3 + (1-x)\text{PbTiO}_3 + \alpha\text{MnO} + \beta\text{Pb}(\text{Cu}_{1/2}\text{W}_{1/2})\text{O}_3$

| Sample Number | $x$ | $1-x$ | $\alpha$ | $\beta$ | Firing Temperature (° C.) | $\epsilon$ | tan δ % | $\rho$ |
|---|---|---|---|---|---|---|---|---|
| *1 | 0.87 | 0.13 | 0 | 0 | 1100 | 2940 | 0.5 | $7.52 \times 10^{10}$ |
| *2 | 0.80 | 0.20 | 0 | 0 | 1100 | 6480 | 0.8 | $6.92 \times 10^{10}$ |
| *3 | 0.70 | 0.30 | 0 | 0 | 1100 | 14200 | 1.6 | $2.88 \times 10^{10}$ |
| *4 | 0.60 | 0.40 | 0 | 0 | 1100 | 4480 | 2.9 | $8.12 \times 10^{9}$ |
| *5 | 0.57 | 0.43 | 0 | 0 | 1100 | 2870 | 4.6 | $3.47 \times 10^{9}$ |
| 6 | 0.87 | 0.13 | 0.5 | 0 | 990 | 2060 | 0.3 | $2.57 \times 10^{12}$ |
| 7 | 0.80 | 0.20 | 0.5 | 0 | 990 | 4540 | 0.4 | $1.02 \times 10^{12}$ |
| 8 | 0.75 | 0.25 | 0.5 | 0 | 990 | 5340 | 0.5 | $8.73 \times 10^{11}$ |
| 9 | 0.70 | 0.30 | 0.5 | 0 | 990 | 10800 | 0.9 | $7.54 \times 10^{11}$ |
| 10 | 0.65 | 0.35 | 0.5 | 0 | 990 | 5570 | 1.2 | $3.31 \times 10^{11}$ |
| 11 | 0.60 | 0.40 | 0.5 | 0 | 990 | 3450 | 1.7 | $1.74 \times 10^{11}$ |
| 12 | 0.57 | 0.43 | 0.5 | 0 | 990 | 2010 | 2.6 | $1.12 \times 10^{11}$ |
| 13 | 0.87 | 0.13 | 1 | 0 | 970 | 1760 | 0.4 | $2.42 \times 10^{11}$ |
| 14 | 0.80 | 0.20 | 1 | 0 | 970 | 3940 | 0.4 | $9.94 \times 10^{11}$ |
| 15 | 0.75 | 0.25 | 1 | 0 | 970 | 5250 | 0.5 | $8.77 \times 10^{11}$ |
| 16 | 0.70 | 0.30 | 1 | 0 | 970 | 8550 | 0.8 | $7.12 \times 10^{11}$ |
| 17 | 0.65 | 0.35 | 1 | 0 | 970 | 5060 | 1.0 | $3.96 \times 10^{11}$ |
| 18 | 0.60 | 0.40 | 1 | 0 | 970 | 2690 | 1.5 | $2.32 \times 10^{11}$ |
| 19 | 0.57 | 0.43 | 1 | 0 | 970 | 1720 | 2.1 | $1.89 \times 10^{11}$ |
| 20 | 0.87 | 0.13 | 0 | 3 | 960 | 2740 | 0.4 | $7.61 \times 10^{11}$ |
| 21 | 0.80 | 0.20 | 0 | 3 | 960 | 4830 | 0.9 | $6.72 \times 10^{11}$ |
| 22 | 0.75 | 0.25 | 0 | 3 | 960 | 5780 | 1.3 | $5.68 \times 10^{11}$ |
| 23 | 0.70 | 0.30 | 0 | 3 | 960 | 12790 | 1.5 | $3.93 \times 10^{11}$ |
| 24 | 0.65 | 0.35 | 0 | 3 | 960 | 5110 | 2.1 | $3.19 \times 10^{11}$ |
| 25 | 0.60 | 0.40 | 0 | 3 | 960 | 4040 | 3.1 | $2.55 \times 10^{11}$ |
| 26 | 0.57 | 0.43 | 0 | 3 | 960 | 2580 | 4.5 | $1.56 \times 10^{11}$ |
| 27 | 0.87 | 0.13 | 0 | 9 | 900 | 1860 | 1.0 | $6.83 \times 10^{11}$ |
| 28 | 0.80 | 0.20 | 0 | 9 | 900 | 4080 | 1.3 | $6.21 \times 10^{11}$ |
| 29 | 0.75 | 0.25 | 0 | 9 | 900 | 5490 | 1.7 | $4.93 \times 10^{11}$ |
| 30 | 0.70 | 0.30 | 0 | 9 | 900 | 8940 | 2.1 | $4.15 \times 10^{11}$ |
| 31 | 0.65 | 0.35 | 0 | 9 | 900 | 5210 | 2.9 | $4.08 \times 10^{11}$ |
| 32 | 0.60 | 0.40 | 0 | 9 | 900 | 2830 | 3.5 | $3.86 \times 10^{11}$ |
| 33 | 0.57 | 0.43 | 0 | 9 | 900 | 1800 | 5.1 | $2.03 \times 10^{11}$ |
| 34 | 0.87 | 0.13 | 0.5 | 3 | 950 | 1950 | 0.3 | $3.61 \times 10^{11}$ |
| 35 | 0.80 | 0.20 | 0.5 | 3 | 950 | 4310 | 0.4 | $1.36 \times 10^{11}$ |
| 36 | 0.70 | 0.30 | 0.5 | 3 | 950 | 10280 | 1.0 | $8.71 \times 10^{11}$ |
| 37 | 0.60 | 0.40 | 0.5 | 3 | 950 | 3280 | 1.9 | $2.34 \times 10^{11}$ |
| 38 | 0.57 | 0.43 | 0.5 | 3 | 950 | 1910 | 3.1 | $9.67 \times 10^{11}$ |

Samples with * are outside the scope of the invention.

As is obvious from Table 1, samples Nos. 1, 2, 3, 4 and 5, which contained none of the manganese oxide (MnO) additive or the group $\text{Pb}_3\text{O}_4$, CuO and $\text{WO}_3$ additive and which are outside the scope of the invention, all had a low specific resistivity, $\rho < 10^{11}$ Ω·cm, or that is, those samples all had relatively low insulation resistance, and, in addition, those samples required a high firing temperature of 1100° C. As opposed to these, samples Nos. 6 to 30 which are within the scope of the invention all had a high specific resistivity, $\rho > 10^{11}$ Ω·cm, or that is, those samples all had high insulation resistance, and those samples were successfully fired at temperatures lower than 1000° C. As is also obvious from Table 1, the samples that satisfy the requirement for $0.65 \leq x \leq 0.75$ had a much higher specific inductive capacity $\in$. In particular, samples Nos. 9, 16, 23, 30 and 36 with x=0.7 had a highest specific inductive capacity $\in$ relative to the varying x in the other samples. Though not shown in Table 1, samples with x<0.57 and those with 0.87<x could be fired at temperatures lower than 1000° C., but their specific inductive capacity $\in$ was low and not higher than 1700. Therefore, in the present invention, preferred is $0.57 \leq x \leq 0.87$, more preferred is $0.65 \leq x \leq 0.75$, and most preferred is x=about 0.7. Though not shown in Table 1, where 1<α or where 9<β, the specific inductive capacity $\in$ of the dielectric ceramic composition of the invention is often significantly lowered. Therefore, in the invention, preferred is $\alpha \leq 1$ or $\beta \leq 9$ (provided that $\alpha + \beta \neq 0$).

As has been described hereinabove, the dielectric ceramic composition of the invention can be fired at temperatures lower than 1000° C., while having a high specific inductive capacity $\in$ and high insulation resistance. Therefore, when the dielectric ceramic composition of the invention is used, it is possible to provide monolithic ceramic capacitors having large capacitance and high insulation resistance and, in addition, inexpensive silver and silver alloys can be used to form the inner electrodes in those monolithic ceramic capacitors. Accordingly, using the composition of the invention, good monolithic ceramic capacitors can be produced at low costs.

While the invention has been described in detail and with reference to specific embodiments thereof, it will be apparent to one skilled in the art that various changes and modifications can be made therein without departing from the spirit and scope thereof.

What is claimed is:

1. A dielectric ceramic composition comprising:
   a solid solution of lead nickel niobate $\text{Pb}(\text{Ni}_{1/3}\text{Nb}_{2/3})\text{O}_3$ and lead titanate $\text{PbTiO}_3$; and
   an additive of $\text{Pb}_3\text{O}_4$, CuO and $\text{WO}_3$ forming a composition represented by the formula $\text{Pb}(\text{Cu}_{1/2}\text{W}_{1/2})\text{O}_3$.

2. A dielectric ceramic composition according to claim 1 containing manganese oxide.

3. A dielectric ceramic composition according to claim 2, wherein the amount of said manganese oxide is not larger than about 1% by weight relative to the solid solution.

4. A dielectric ceramic composition according to claim 1, wherein the amount of said additive (a) is not larger than about 9% by weight in terms of $\text{Pb}(\text{Cu}_{1/2}\text{W}_{1/2})\text{O}_3$ and relative to the solid solution.

5. A dielectric ceramic composition according to claim 1, wherein the amount of additive is not larger than about 9% by weight in terms of $\text{Pb}(\text{Cu}_{1/2}\text{W}_{1/2})\text{O}_3$ and relative to the solid solution.

6. A dielectric ceramic composition according to claim 3, wherein said solid solution is represented by the formula:

$$x\text{Pb}(\text{Ni}_{1/3}\text{Nb}_{2/3})\text{O}_3-(1-x)\text{PbTiO}_3,$$

in which x represents a molar fraction of $0.57 \leq x \leq 0.87$, the amount of manganese oxide is not larger than about 0.75% by weight relative to the solid solution and the amount of additive (a) is not larger than about 4.5% by weight in terms of $\text{Pb}(\text{Cu}_{1/2}\text{W}_{1/2})\text{O}_3$ and relative to the solid solution.

7. A dielectric ceramic composition according to claim 1, wherein said solid solution is represented by the formula:

$$x\text{Pb}(\text{Ni}_{1/3}\text{Nb}_{2/3})\text{O}_3-(1-x)\text{PbTiO}_3,$$

wherein x represents a molar fraction of $0.57 \leq x \leq 0.87$.

8. A dielectric ceramic according to claim 7, wherein x represents a molar fraction of $0.65 \leq x \leq 0.75$.

9. A monolithic ceramic capacitor comprising a plurality of ceramic layers and a plurality of electrodes each of which is disposed between two adjacent ceramic layers, wherein said ceramic layers comprise a dielectric ceramic composition according to claim 1.

10. A monolithic ceramic capacitor comprising a plurality of ceramic layers and a plurality of electrodes each of which is disposed between two adjacent ceramic layers, wherein said ceramic layers comprise a dielectric ceramic composition according to claim 2.

11. A monolithic ceramic capacitor comprising a plurality of ceramic layers and a plurality of electrodes each of which is disposed between two adjacent ceramic layers, wherein said ceramic layers comprise a dielectric ceramic composition according to claim 3.

12. A monolithic ceramic capacitor comprising a plurality of ceramic layers and a plurality of electrodes each of which is disposed between two adjacent ceramic layers, wherein said ceramic layers comprise a dielectric ceramic composition according to claim 4.

13. A monolithic ceramic capacitor comprising a plurality of ceramic layers and a plurality of electrodes each of which is disposed between two adjacent ceramic layers, wherein said ceramic layers comprise a dielectric ceramic composition according to claim 5.

14. A monolithic ceramic capacitor comprising a plurality of ceramic layers and a plurality of electrodes each of which is disposed between two adjacent ceramic layers, wherein said ceramic layers comprise a dielectric ceramic composition according to claim 6.

15. A monolithic ceramic capacitor comprising a plurality of ceramic layers and a plurality of electrodes each of which is disposed between two adjacent ceramic layers, wherein said ceramic layers comprise a dielectric ceramic composition according to claim 7.

16. A method of producing a dielectric ceramic composition comprising the steps of:

providing a mixture of $Pb_3O_4$, NiO, $Nb_2O_5$, $TiO_2$, CuO, $WO_3$ and MnO in amounts to satisfy the formula $$xPb(Ni_{1/3}Nb_{2/3})O_3+(1-x)PbTiO_3+\alpha MnO+\beta Pb(Cu_{1/2}W_{1/2})O_3$$

wherein $0.57 \leq x \leq 0.87$, $\alpha$ is not larger than about 1 wt %, $\beta$ is not larger than about 9 wt % and $\alpha+\beta \neq 0$; and firing said mixture to form a solid solution of $xPb(Ni_{1/3}Nb_{2/3})O_3+(1-x)PbTiO_3$.

* * * * *